(12) United States Patent
Smith et al.

(10) Patent No.: US 11,295,126 B1
(45) Date of Patent: Apr. 5, 2022

(54) METHODS FOR AUTHENTICATING GOODS USING RANDOMLY DISTRIBUTED FLECKS AND SERIALIZATION CODES

(71) Applicant: Covectra, Inc., Westborough, MA (US)

(72) Inventors: Richard Smith, Pottstown, PA (US); Ronald Ducharme, Dudley, MA (US); Abhijeet Bhandari, Shrewsbury, MA (US); Stephen M. Wood, Waterford, CT (US); Gary Miloscia, Hopkinton, MA (US)

(73) Assignee: Covectra, Inc., Westborough, MA (US)

( * ) Notice: Subject to any disclaimer, the term of this patent is extended or adjusted under 35 U.S.C. 154(b) by 0 days.

(21) Appl. No.: 17/357,771

(22) Filed: Jun. 24, 2021

(51) Int. Cl.
*G06K 9/62* (2006.01)
*G06K 9/00* (2022.01)
*G06K 7/14* (2006.01)
*G06K 9/46* (2006.01)

(52) U.S. Cl.
CPC ....... *G06K 9/00577* (2013.01); *G06K 7/1413* (2013.01); *G06K 9/4652* (2013.01); *G06K 9/6212* (2013.01)

(58) Field of Classification Search
CPC ............ G06K 9/00577; G06K 7/1413; G06K 9/4652; G06K 9/6212
USPC ........................................................ 382/165
See application file for complete search history.

(56) References Cited

U.S. PATENT DOCUMENTS

| | | | |
|---|---|---|---|
| 4,606,927 A | 8/1986 | Jones | |
| 4,785,290 A | 11/1988 | Goldman et al. | |
| 6,722,699 B2 | 4/2004 | Patton et al. | |
| 7,350,716 B2 | 4/2008 | Gilfix et al. | |
| 7,702,108 B2 | 4/2010 | Amon et al. | |
| 7,831,042 B2 | 11/2010 | Stierman et al. | |
| 7,885,428 B2 | 2/2011 | Stierman et al. | |
| 7,891,565 B2 | 2/2011 | Pinchen et al. | |
| 8,062,737 B2 | 11/2011 | Abrams et al. | |
| 8,171,567 B1 | 5/2012 | Fraser et al. | |
| 8,171,657 B1 | 5/2012 | Perenich | |
| 8,488,842 B2 | 7/2013 | Wood et al. | |
| 8,534,544 B1 * | 9/2013 | Eker | G06K 19/10 235/375 |

(Continued)

FOREIGN PATENT DOCUMENTS

| | | |
|---|---|---|
| GB | 2 304 077 A | 3/1997 |
| WO | WO 2007/090437 A1 | 8/2007 |

OTHER PUBLICATIONS

Non-Final Office Action dated Jan. 28, 2013 for U.S. Appl. No. 13/507,320, 10 pages.

(Continued)

*Primary Examiner* — Ali Bayat
(74) *Attorney, Agent, or Firm* — Cooley LLP

(57) ABSTRACT

An authentication method includes receiving, at a processor, a signal representing an image of a serialization code and multiple flecks of a label, the flecks having a random distribution. The processor detects the serialization code and applies a modification to the image to produce a modified image. A subset of flecks of the modified image is detected, and metrics associated with each fleck from the subset of flecks are identified. The identified metrics are compared with metrics associated with a unique signature, and a message is displayed, via a user interface, indicating an authenticity of the label based on the comparison.

22 Claims, 6 Drawing Sheets

(56) References Cited

U.S. PATENT DOCUMENTS

| | | |
|---|---|---|
| 8,908,920 B2 | 12/2014 | Wood et al. |
| 9,476,839 B2 * | 10/2016 | Ranieri .................. G01N 21/95 |
| 10,140,492 B1 * | 11/2018 | Nair .................. G06K 7/10861 |
| 2007/0036470 A1 | 2/2007 | Piersol et al. |
| 2010/0128964 A1 | 5/2010 | Blair |
| 2010/0312574 A1 * | 12/2010 | Yoo .................. G01N 35/00069 |
| | | 705/2 |
| 2010/0327485 A1 * | 12/2010 | Maaninen ........ B29D 11/00365 |
| | | 264/293 |
| 2011/0135160 A1 | 6/2011 | Sagan et al. |
| 2011/0229628 A1 * | 9/2011 | Schmitt-Lewen ...... B41F 23/04 |
| | | 427/7 |
| 2012/0104097 A1 | 5/2012 | Moran et al. |
| 2015/0053755 A1 | 2/2015 | Wood et al. |

OTHER PUBLICATIONS

Non-Final Office Action dated Feb. 5, 2014 for U.S. Appl. No. 13/986,872, 7 pages.
Non-Final Office Action dated Mar. 3, 2015 for U.S. Appl. No. 14/121,922, 6 pages.
International Search Report and Written Opinion dated Jul. 16, 2013 for International Application No. PCT/US2012/043502, 11 pages.

* cited by examiner

METHODS FOR AUTHENTICATING GOODS USING RANDOMLY DISTRIBUTED FLECKS AND SERIALIZATION CODES

TECHNICAL FIELD

The present disclosure generally relates to systems and methods for identifying and authenticating an object of interest, and particularly to systems and methods for consumers to verify the authenticity of a tangible product or good based on a unique signature associated with the good.

BACKGROUND

The trade in counterfeit goods, worth billions of dollars each year, is a growing concern. It affects legitimate companies by violating their trademarks and devaluing corporate reputation. The trade in counterfeit goods undercuts jobs that would otherwise be offered by legitimate companies. In some cases, the trade involves a highly sophisticated network of organized crime, whose money may go to fund terrorism. Additionally, some counterfeit goods, such as medicines, can endanger the safety and well-being of people consuming the counterfeit medicines. In the global market, as counterfeiting technologies become more sophisticated, it is becoming increasingly difficult to determine whether a good in the supply chain is authentic.

In addition to the trade in counterfeit goods, legitimate businesses must combat gray market diversion of their goods. Gray market diversion occurs when goods intended for a specific market are improperly redirected to an alternative market, usually in violation of the intent of a brand owner of a product or in violation of legal channels. The diverter can be any entity in the supply chain including, for example, distributors, wholesalers, retailers, organize crime, or another entity. It can be difficult to track movement of authentic goods after they depart the manufacturer and are moved through the supply chain.

Counterfeit consumer products goods can resemble and/or closely imitate products fabricated by others. Counterfeit products are products of inferior quality, which in some instances can compromise the safety and well-being of consumers who are deceived into purchasing them unaware of the counterfeit product standards of manufacture practice, and overall quality. For example, counterfeit cosmetic products can include low cost chemical reagents that are not approved for human consumption and that can induce chemical burns, allergic reactions, and even long-term health problems. Consumers lack sufficient access to methods and/or technologies to verify the authenticity of products and distinguish them from potential counterfeit products. Consequently, there is a need for improved systems and methods for authenticating goods, allowing consumers to detect and avoid counterfeit products, deterring counterfeiting and diversion by providing for authentication and tracking of goods at the individual unit level as each individual unit is moved through the supply chain.

SUMMARY

The present disclosure describes systems and methods for identifying, tracking, tracing and determining the authenticity of a tangible product or good. In some embodiments, a method includes receiving, at a processor, a signal representing an image of a serialization code and a plurality of flecks of a label. The plurality of flecks can have a random distribution. The method also includes detecting, via the processor, the serialization code, and applying a modification to the image to produce a modified image. The method also includes identifying, via the processor and within the modified image, a subset of flecks from the plurality of flecks. The processor also identifies metrics associated with each fleck from the subset of flecks; and compares the identified metrics with metrics associated with a unique signature. The method also includes causing display, via a user interface, of a message indicating an authenticity of the label based on the comparison.

In some embodiments, an apparatus includes a label. The label can include a substrate, a serialization code, and a plurality of flecks. The plurality of flecks can have a random distribution. The random distribution includes a plurality of different positions and a plurality of different orientations relative to the substrate. At least a subset of flecks from the plurality of flecks forms a unique signature that is associated with a tangible product. The unique signature is configured to be captured by an imaging device for verification of an authenticity of the tangible product.

In some embodiments, a non-transitory processor-readable medium stores processor executable instructions to receive a signal representing an image of a unique signature. The unique signature includes a serialization code and a plurality of flecks, the plurality of flecks having a distribution of sizes, shapes, and/or positions (e.g., positions within a two-dimensional area and/or depth positions). The processor-executable instructions also include instructions to detect the serialization code, and to apply a modification to the image to produce a modified image. The processor-executable instructions also include instructions to identify, within the modified image, a subset of flecks from the plurality of flecks, and to compare the identified metrics with metrics associated with the unique signature. The processor-executable instructions also include instructions to cause display, via a user interface, of a message indicating an authenticity of the unique signature based on the comparison.

BRIEF DESCRIPTION OF THE DRAWINGS

It is to be understood that the drawings primarily are for illustrative purposes and are not intended to limit the scope of the subject matter described herein.

DETAILED DESCRIPTION

Figure 1:
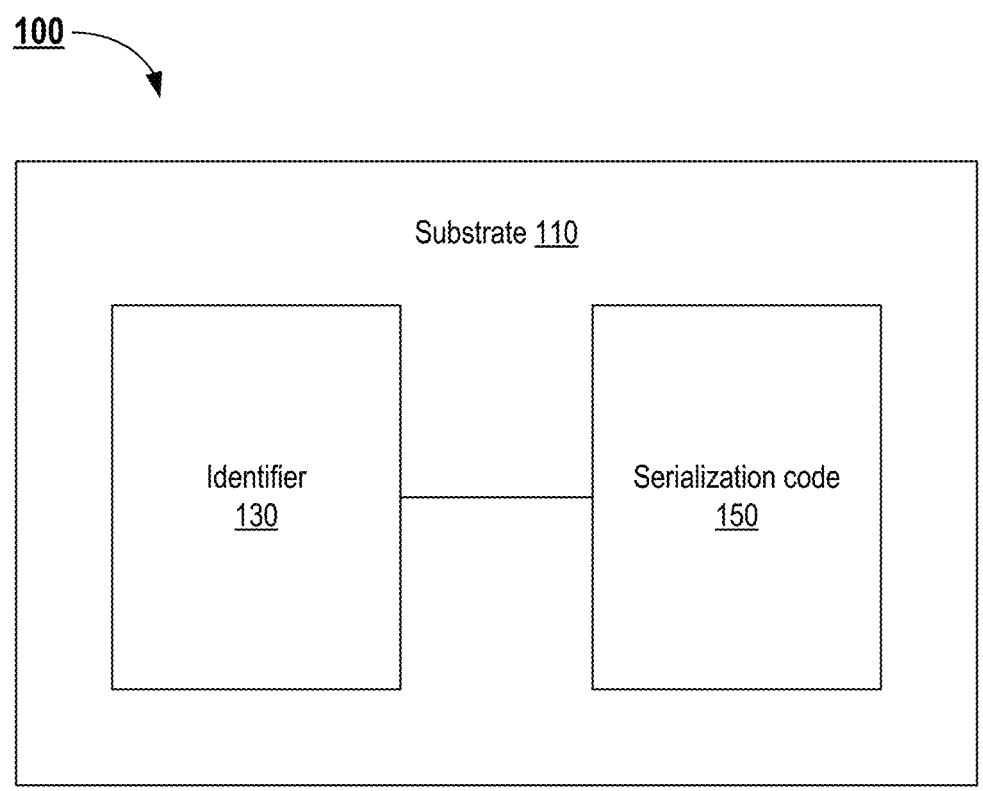
FIG. 1 is a schematic illustration of an apparatus for authenticating a tangible product according to an embodiment.

Systems and methods for tracking and authenticating a tangible product or good are described herein. These systems and methods are useful to prevent the dissemination of counterfeit and diverted products or goods. The systems and methods described herein can be used by manufacturers, distributors, import and/or export authorities, wholesalers, retailers, law enforcement authorities, or others within a supply chain to determine whether a product being handled is authentic, as well as to track movement of the product or good through the supply chain. Additionally, the systems and methods described herein can be used directly by consumers to verify the authenticity of a product that a consumer intends to acquire and/or use.

Known methods for preventing counterfeiting of products such as consumer products include serialization. Serialization is the process of creating and applying unique identifiers, for example, bar codes, QR codes, serial numbers, RFIDs, or any other identifiers on the product such that the product can be identified and traced back to its origin at any point in the supply chain. Most known products, for example, baby formula, baby food, cereal, shampoos, conditioners, medical products, and the like, are provided with a single unique identifier, for example, a unique serialized bar code on the product container. However, the level of protection against counterfeiting provided by a single identifier, (for example, a single bar code on a product container) is often not sufficient to prevent counterfeiting of the product. For example, as counterfeiting technologies have become more sophisticated, such known single identifiers can be duplicated and used on numerous packages to bypass known authentication systems.

Authentication systems and methods set forth herein facilitate the association of multiple unique identifiers with a single product, and the multiple unique identifiers can be used in combination to determine the authenticity of the single product. Systems and methods for authentication of products described herein provide several advantages, including, for example: (i) multiple unique identifiers to provide multiple levels of protection against counterfeiting; (ii) storage of serialization and authentication data on a secure cloud database separate from a retail store database, (iii) enhanced protection against counterfeiting using combinations of QR codes, serial numbers, and image identifiers, making the collective identifiers difficult to replicate; (iv) ability to perform both tracking/tracing and authentication of products using the same set of multiple unique identifiers; and (v) ability to integrate the system and method with existing tracking/tracing, serialization, and aggregation systems. Examples of such tracking/tracing, serialization, and aggregation systems are described in U.S. Pat. No. 8,488,842, titled "Systems and Methods for Tracking and Authenticating Goods" issued on Jul. 16, 2013, U.S. Pat. No. 9,233,400, titled "Systems and Methods for Aggregating Serialized Goods" issued on Jan. 12, 2016, and U.S. Pat. No. 9,697,526 titled "Systems and Methods for Authenticating Goods" issued on Jul. 4, 2017, the disclosures of each of which are hereby incorporated by reference in their entireties.

As used herein, a "good" refers to any item, article, or product, including, but not limited to, a product label, identification card, product packaging, distribution packaging (e.g., a carton, box, pallet, or the like), pharmaceutical packaging (e.g., a carton, bottle, blister pack, pouch, bag, label, or other container), a pharmaceutical unit of sale (e.g., a testing strip, a medicament strip, patch, tablet, capsule, oral thin film, bioerodible mucoadhesive film, or the like), or another individual unit, item, product, or article. For example, a good can refer to a pharmaceutical, jewelry, beverage, cosmetic, electronic device, or any other product.

As used herein, the phrase "unique signature" refers to a feature or combination of features that is unique to an individual good or a particular good, and which can distinguish the particular good from another good (e.g., in a group of similar goods). Said another way, the unique signature is a characteristic of one particular good which distinguishes that good from a seemingly similar good. A good bearing the unique signature is considered to be authentic. In this manner, the unique signature can be used to help determine whether a good is authentic or counterfeit As used herein, the term "bar code" refers to the representation of data in a visual, machine-readable form. Bar codes can represent data by using parallel lines of varying widths and spacings (1-D bar codes) that can be read by optical scanners. A bar code may be typically rectangular in shape, and may be placed on a label, printed on an object, attached to an object, or otherwise associated with an object to be identified.

As used herein, the term "QR code" refers to a machine-readable code, typically including bars, squares, rectangles, dots, hexagons, and other geometrical patterns collectively referred to as matrix codes or 2-D bar codes. A QR code may be placed on a label, printed on an object, attached to an object, or otherwise associated with an object to be identified.

As used herein, the terms "about" and "approximately" generally mean plus or minus 10% of the value stated, for example about 250 μm would include 225 μm to 275 μm, and approximately 1,000 μm would include 900 μm to 1,100 μm.

FIG. 1 shows an apparatus 100 for authenticating a product, according to an embodiment. The apparatus 100 can be associated with a product or good, for example during the initial manufacturing and/or packaging of the product, and then can be used by a consumer and/or a user to authenticate the product and/or trace the product as it moves along a supply chain. The apparatus 100 can be a multilayer label that can be applied onto a product or good or its packaging as a closing seal, and that can comprise flecks (e.g., relatively small spots of color and/or reflectance), particles, or other three-dimensional objects disposed in and/or on the label. As shown in FIG. 1, the apparatus 100, which can also be referred to as the label 100 can include a substrate 110, an identifier 130, and a serialization code 150. The identifier 130 and the serialization code 150 are disposed on the substrate 110 and are operable to authenticate the consumer product associated to the label 100. In some embodiments, the label 100 can be a used to authenticate a product or good associated with the label 100 when the identifier 130 and the serialization code 150 are each authenticated in a successive order. In some implementations, a consumer and/or user can interact with each of the identifier 130 and the serialization code 150 in a predefined sequence. Information about the identifier 130 and the serialization code 150 can be communicated to an external device (not shown) to determine the authenticity of the product, as further described herein.

The substrate 110 can include one or more planar layers, sheets or films that provides mechanical support and accommodates all the components of the label 100. The substrate 110 can be any suitable size, shape or material. For example, in some embodiments the substrate 110 can have an overall shape that is rectangular, circular, triangular, polyhedral, or any other suitable geometrical shape, and/or can include one or more layers having a rectangular, circular, triangular, polyhedral, or any other suitable geometrical shape. In other embodiments, the substrate 110 can have an overall shape that is irregular. In some embodiments, the substrate 110 can be made of one or more polymeric materials including, but not limited to polyethylene terephthalate (PET), polypropylene (PP), high density polyethylene (HDPE), polyethylene (PE), polyvinyl chloride (PVC), acetates, and the like. In some embodiments, the substrate 110 can comprise paper and/or another textile such as nylon taffeta fabric.

Figure 2A:
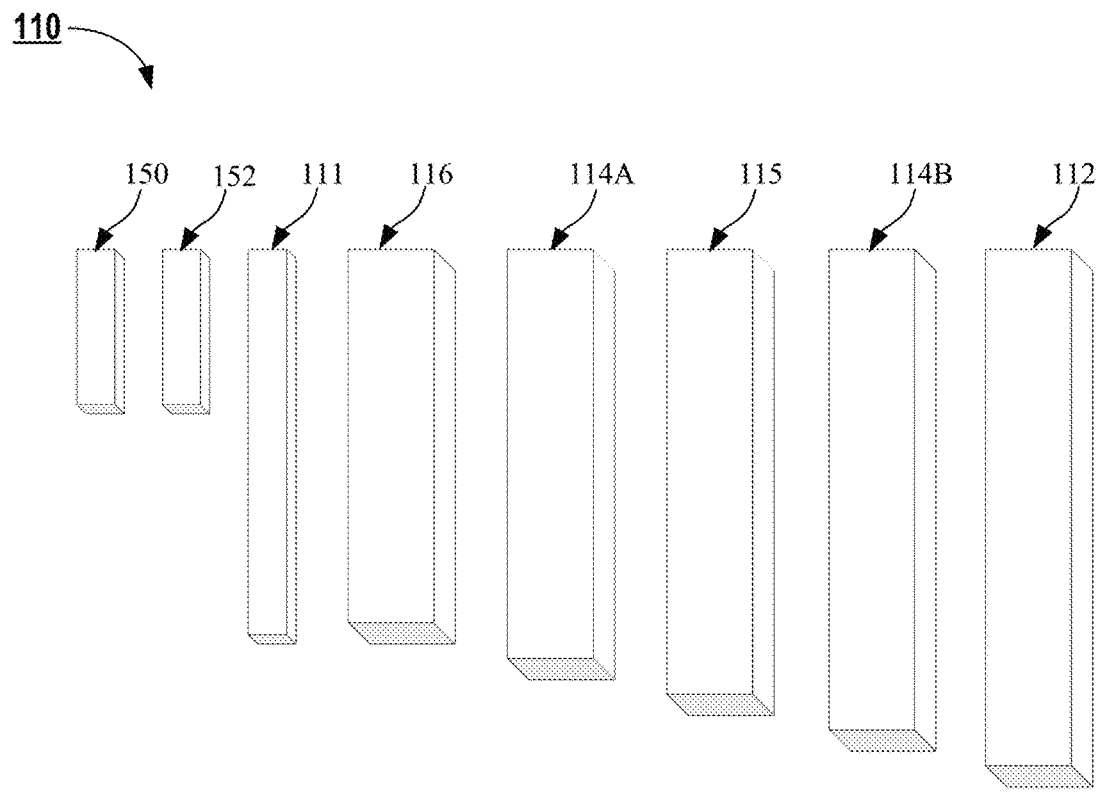
FIG. 2A is a schematic illustration of a substrate of an apparatus for authenticating a tangible product according to an embodiment.

In some embodiments, the substrate 110 includes multiple stacked layers including two or more top coatings 111, a plurality of film layers 116 (one or more of which may be optically transparent), an adhesive layer 114A (which optionally includes a plurality of flecks or other identifiers 130), a white base layer 115, a base adhesive layer 114B, and a release liner 112, as shown in FIG. 2A. The top coatings 111 can include a printable coating (e.g., to facilitate printing a QR code 150 onto a white base layer 152, as shown in FIG. 2A and as further described herein), a UV-based or water-based coating to protect the film layers 116 and/or to enhance printability, a UV-blocking layer to protect one or more of the film layers 116, the adhesive layer 114A, the white base layer 115, the base adhesive layer 114B, or the release liner 112, and/or another durable coating of film to protect one or more structures of the substrate 110 from chemicals, UV light degradation, and/or scratches. The plurality of film layers 116 (also referred to herein as face stock layers 116) can include one or more "clear" (i.e., optically transparent) coatings. Alternatively, or in addition, the clear face stock layers 116 can include a coating or a chemical additive configured to impart specific optical characteristics and/or aesthetic characteristics to the label 100. For example, in some embodiments the clear face stock layers 116 can include a coating that reflects light (e.g., to provide a gloss appearance), scatters light (e.g., to provide a haze appearance), or blocks and/or absorbs light of specific wavelengths (e.g., to provide opacity). In some embodiments, the clear face stock layers 116 can include a coating with a predefined index of refraction. In some embodiments, the clear face stock layers 116 include a thick coating configured to accommodate one or more components of the label 100 at different depths from the external surface of the apparatus 100, as further described herein. In some embodiments, the clear face stock layers 116 are used to at least partially accommodate and/or house one or more components of the label 100, such as the identifier 130 and/or the serialization code 150.

The white base layer 115 is mechanically coupled to the face stock layers 116 via the adhesive layer 114A. The white base layer 115 can be configured to provide mechanical properties to the label 100. In some embodiments, the white base layer 115 has a thickness sufficient to withstand and/or resist mechanical deformation of the label 100 due to exposure to external force(s) during manufacturing and/or use of the label 100. In some embodiments, the white base layer 115 is the thickest layer of the substrate 110. The white base layer can have an opacity rating of a minimum rating of about 80%, with an ideal range of about 83% to about 94%, for example as measured using one or more standardized methods such as TAPPI T-425.

The adhesive layer 114A is disposed between the face stock layers 116 and the white base layer 115, as shown in FIG. 2A. The base adhesive layer 114B is configured to attach to and/or adhere to a surface of a consumer product and/or its packaging, to secure (e.g., permanently) the apparatus 100 to that consumer product. The adhesive layer 114A and 114B can include one or more chemical species that form a bond between a surface of the label 100, within or between layers of the label 100, and/or with a surface of a consumer product. The adhesive layers 114A and 114B can include one or more chemicals that impart specific adhesive properties including initial tack, ultimate adhesion, shear resistance, UV resistance, solvent resistance, mandrel hold, cold flow, minimum application temperature, and/or service temperature range. In some embodiments, the adhesive layer 114A and 114B can include a chemical formulation compliant for indirect food contact (e.g., non-toxic and/or meeting Registration, Evaluation, Authorization, and Restriction of Chemicals (REACH), Restriction of Hazardous Substances (RoHS), and/or Safe Drinking Water and Toxic Enforcement Act of 1986 requirements). For example, the chemical formulation will be non-toxic. In some embodiments, the adhesive layer 114A and 114B can include a chemical formulation (e.g., including one or more of: an emulsion or solvent-based acrylic adhesive, an emulsion or solvent-based natural rubber based adhesive, an emulsion or solvent-based synthetic rubber based adhesive, a hot melt adhesive, or a UV-curable adhesive) that is configured to form a strong bond with a specific desired material, such as glass, paper, cardboard, metal or fabric. In some embodiments, the adhesive layer includes a chemical formulation (e.g., including one or more of: an emulsion or solvent-based acrylic adhesive, an emulsion or solvent-based natural rubber based adhesive, an emulsion or solvent-based synthetic rubber based adhesive, a hot melt adhesive, or a UV-curable adhesive) suitable for adhering to the surface of a consumer product or its packaging even in the presence of one or more of dirt, oil, or dust. In some embodiments, the adhesive layer 114A and 114B can include a chemical formulation (e.g., including one or more of an emulsion or solvent-based acrylic adhesive, an emulsion or solvent-based natural rubber based adhesive, an emulsion or solvent-based synthetic rubber based adhesive, a hot melt adhesive, or a UV-curable adhesive) that is formulated to flow at low temperatures, such that the apparatus 100 can adhere to a consumer product or its packaging at very low temperatures not exceeding 32 F. In some embodiments, the adhesive layer 114A and 114B can include a chemical formulation such as an emulsion or solvent acrylic adhesive that is tolerant to moisture (e.g., moisture-resistant or waterproof), such that the apparatus 100 can adhere to a consumer product or its packaging, and retain its associated adhesive strength, even in high humidity environments. In other words, apparatuses 100 described herein can be compatible with environments in which liquids, gels and cremes are packaged. Such environments can include elevated temperatures to allow even/uniform flow of product into containers.

The release liner 112 can be a film or layer configured to isolate and/or protect the adhesive layer 114B prior the attaching the label 100 to a consumer product or its packaging. The release liner 112 can be made of paper or plastic, with or without recycled content, and can be coated on one or both sides with a release agent such as silicone, to prevent a bond from forming between a surface of the adhesive layer 114B and the release liner 112. In some embodiments, the release liner can be suitable for optical sensing. For example, the release liner can be sufficiently transparent such that an optical signal can be transmitted through the release liner.

The identifier 130 of the label 100 can include a group of small flecks, particles, specks, spots, dots, whorls, arches, or any three-dimensional object or pattern, which are collectively referred to herein as "flecks" and that can be disposed on the substrate 110. The identifier 130 can include flecks of any suitable size, shape, and color. For example, in some embodiments, the flecks can be rectangular, circular, triangular, polyhedral, or any suitable geometrical shape. In other embodiments, the flecks can have an irregular shape. In some embodiments, each of the flecks can have the same geometrical shape. In other embodiments, the flecks can have multiple geometrical shapes. For example, in some embodiments, the flecks can include a first portion of flecks or particles having a rectangular shape, a second portion of flecks or particles having a circular shape, and a third portion of flecks or particles having a triangular shape. In some embodiments, all or substantially all of the flecks can have approximately the same size, and in other embodiments, the flecks can have different sizes. In some embodiments, the flecks can be substantially planar. In other embodiments, the flecks can be a three-dimensional shape. I some embodiments, the flecks can include a first portion of flecks having a substantially planar shape, and a second portion of flecks having a spherical shape.

In some embodiments, the identifier 130 can include flecks made of one or more materials including, but not limited to: metal, paper, plastic, glass, and/or ceramic. In some embodiments, the flecks can have predefined optical properties. For example, in some embodiments, the flecks can be made of a highly reflective material or include a highly reflective coating. In some embodiments, the flecks can include a first portion of flecks made of highly reflective material, and a second portion of flecks made of a non-reflective material. In some embodiments, the flecks can have one or more colors. For example, in some embodiments the flecks can be a single color. In some embodiments, the flecks can include a first portion of flecks having a first color, and a second portion of flecks having a second color different from the first color. In some embodiments, the flecks include a first portion of flecks having a first color, a second portion of flecks having a second color different from the first color, and a third portion of flecks having a third color different from the first and the second color. In some embodiments, the flecks include three or more portions of flecks, each having a different color. Alternatively or in addition, the flecks can include two or more portions of flecks each having a different size distribution and/or shape distribution.

The identifier 130 can include flecks randomly distributed on and/or within the substrate 110. For example, in some embodiments, the flecks or particles can be randomly distributed on a single plane within the substrate 110 (e.g., the flecks are co-planar). Said another way, the flecks can be randomly distributed across the width and length of the substrate 110, at a single predefined depth from the most external or outer surface of the substrate 110. In some embodiments, the flecks can be randomly distributed on and/or within the substrate 110 at varying depths, positions, and/or orientations within the substrate 110. In some embodiments, the flecks can be randomly distributed randomly distributed on and/or within the substrate 110 (e.g., in one or more of the adhesive layer 214, the base layer 215, and/or a face stock layer 216) at varying depths, positions, and/or orientations, and include a portion of flecks made of a reflective material so that the flecks or particles create a distinctive refractive/reflective pattern in response to illumination.

The serialization code 150 can be or represent a unique, traceable serial number that can be associated with a product (e.g., a consumer product) or good. In some embodiments, the serialization code 150 can be or include a QR code, a bar code (e.g., a 2-D bar code), a serial number, an RFID tag, an alphanumeric code, or any combination thereof. In some embodiments, the serialization code can be disposed on and/or within the substrate 110. In some embodiments, the serialization code 150 can be disposed on and/or within the substrate 110 at a predefined position, depth, and orientation. For example, in some embodiments the serialization code 150 can be disposed on the most exterior surface of the substrate 110, optionally at the geometrical center of a surface of the apparatus 100 (e.g., at the center of the apparatus 110 with respect to the width and length of the label 100). Although described herein as a "white" base layer 115, the base layer 115 can alternatively be of any other suitable color (e.g., black), or may be optically transparent.

In some embodiments, the adhesive layer 114A can be configured to attach to and/or adhere to a surface of a consumer product and/or its packaging, to secure (e.g., permanently) the apparatus 100 to that consumer product, for example if the consumer product and or its packaging has significant white color contrast. In some such implementations, one or more of the adhesive layer 114A, the white base layer 115, the base adhesive layer 114B, or the release liner 112 is omitted from the substrate 110.

Figure 2B:
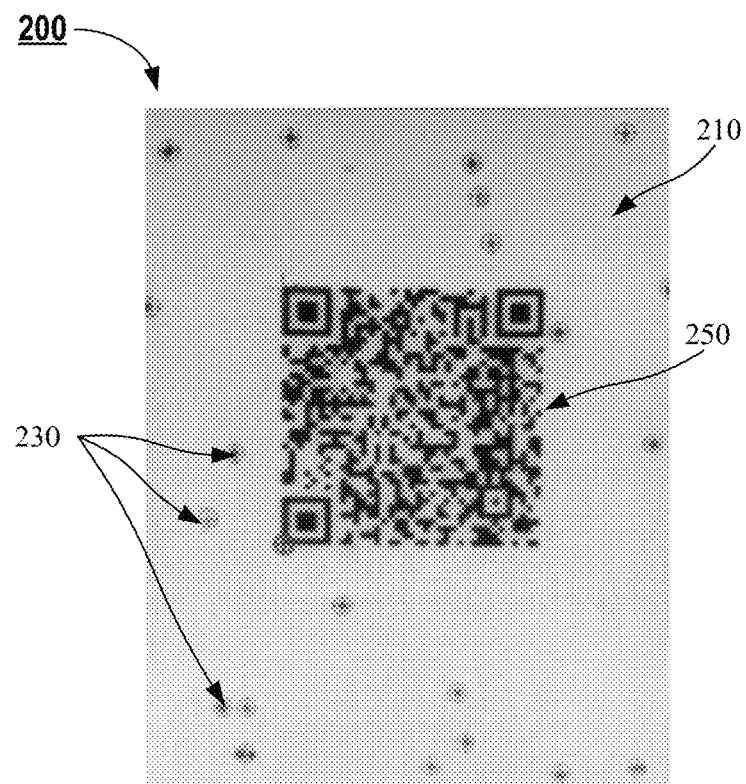
FIG. 2B is an image of an apparatus for authenticating a tangible product according to an embodiment.

FIG. 2B shows an apparatus 200 for authenticating a product according to an embodiment. The apparatus 200 can be similar to or substantially the same as one or more portions of the apparatus 100. For example, the apparatus 200 of FIG. 2B, which can also be referred to as the label 200, includes a substrate 210, an identifier 230, and a serialization code 250. The label 200 can be produced using one or more manufacturing methods that can include, but are not limited to: casting, coating, lamination, screen printing, flexography, thermal printing, laser printing, inkjet printing, digital printing, and/or the like. In some implementations, the label 200 can be produced in large quantities using one or more of the foregoing manufacturing techniques, with each label 200 having a unique identifier 230 and a unique serialization code 250. For example, in some embodiments, the label 200 can be produced by (i) selecting rolls of suitable layer components including a release liner 212, one or more adhesive layers 214, a base layer 215 and a face stock layer 216, (ii) casting and/or laminating the selected rolls of layer components to produce a roll of the substrate 210, and (iii) incorporating a plurality of identifiers 230 and serialization codes 250 on the roll of the substrate 210 using one or more printing methods, with one unique identifier 230 and one unique serialization codes 250 per each apparatus 200. In some embodiments, the label 200 can be produced by first disposing the unique identifier 230 on one or more of the layer components comprising the substrate 210 (e.g., the adhesive layer 214, the base layer 215, and/or the face stock layer 216), and subsequently casting and/or laminating the resulting layer component comprising the identifier 230 to the remaining layer components to produce the substrate 210, and applying the unique serialization code 250 to, or otherwise incorporating the unique serialization code 250 into, the substrate 210, for example using one or more printing methods. In some embodiments, the unique identifier 230 and the unique serialization code 250 can be first disposed on one of the components of the substrate 210, for example the adhesive layer 214, the base layer 215, or the face stock layer 216, and the resulting component comprising the unique identifier 230 and the unique serialization code 250 can then be casted and/or laminated with the other components to produce the label 200. In some embodiments, the unique identifier 230 and the unique serialization code 250 can be independently disposed on different components of the substrate 210, and then the components comprising the identifier 230 and the serialization code 250 can be casted and/or laminated to produce the label(s) 100.

As described above with reference to the identifier 130 of the label 100, the identifier 230 can include a plurality of flecks 232. The identifier 230 can be fabricated by distributing a plurality of flecks in a unique and/or random distribution on the substrate 210 or on one of the components of the substrate 210 (e.g., the adhesive layer 214, the base layer 215, or the face stock layer 216), as shown in FIG. 2B. For example, a fabrication system can be configured to distribute a plurality of substantially planar flecks 232 in a random pattern on the adhesive layer 214 (or a suitable portion thereof). In another example, a fabrication system including a printer (e.g., an ink jet printer) can be programmed or otherwise configured to print a unique pattern of flecks onto the base layer 215, the face stock layer 216, a suitable portion of the base layer 215, or a suitable portion of the face stock layer 216. In some embodiments, at least one of the face stock layer 216, the base layer 215, or the adhesive layer 214 is transparent/clear such that the flecks and/or particles are visible in the apparatus 200, and can be view in two dimensions or in three dimensions. In some embodiments, the flecks 232 can be randomly disposed within the adhesive layer 214 such that the flecks 232 are positioned at different locations and/or with different orientations with respect to the outermost surface of the adhesive layer 214. In other words, the flecks can be randomly distributed within the adhesive layer 214 at different depths from the surface of the adhesive layer 214. Moreover, in some embodiments, the flecks can be disposed within the adhesive layer 214 at different depths and forming different angles with respect to the surface of the adhesive layer 214. In some embodiments, the flecks can be randomly disposed on the adhesive layer 214 such that the face stock layer 216 or portions thereof will be raised, thereby forming a unique three-dimensional pattern.

The serialization code 250 can be fabricated by printing a bar code on a predefined portion or region of the label 200. For example, in some embodiments, the label 200 can be a planar rectangular-shaped multilayer label, and the serialization code 250 can be printed or disposed on the geometrical center of the label, or on a region overlapping the geometrical center of the label, or at another predefined location. In other embodiments, the serialization code 250 can be printed or disposed in close proximity to one of the edges of the rectangular-shaped label 200. In some embodiments, the serialization code 250 can be printed or disposed on a predefined portion or region of the label 200, while the flecks 232 of the identifier 230 can be randomly disposed on the label 200, such that the position of the serialization code 250 can be used as a reference point to describe, reference, or report the position of each individual fleck 232 disposed on the label 200. For example, in some embodiments, the label 200 can be a planar rectangular-shaped multilayer label that includes a serialization code 250 disposed on a predefined region of the label 200 (e.g., one corner of the label 200, near one edge of the label 00, or near the geometrical center of the label 200) and a plurality of flecks 232 randomly distributed on the substrate 200 such that the position of the each fleck 232 can be described, referenced, or reported with respect to the position of the serialization code 250.

In some embodiments, the label 200 is fabricated according to the methods and procedures disclosed above, and a series of subsequent procedures or steps are performed in connection with the use of the label 200 to authenticate a product or good. The subsequent steps can include one or more of: commissioning the label 200, activating the label 200 and validating/authenticating the label 200. Each one of the foregoing procedures, methods or steps are further described herein.

Label Commissioning Procedure

In some embodiments, the commissioning of a label 200 involves performing a number of procedures or steps with the purpose of acquiring specific information or data related to the identifier 230 and the serialization code 250 of each label 200 fabricated according to the procedures described above. The commissioning of the label 200 can include one or more of documenting, recording, registering, or cataloging data associated with the serialization code 250 and/or the identifier 230, to facilitate subsequent authentication of a product or good that may be associated with said label 200. In some embodiments, the commissioning of a label 200 includes imaging the label 200 to produce image data, reading and/or scanning the serialization code 250, storing the produced image data and the corresponding serialization code 250 of the label 200 in a memory (e.g., in a database), analyzing the image data with the purpose of documenting, recording, registering, or cataloging the color of at least a portion of the flecks 232 of the identifier 230 as well as the orientation and/or the position of at least a portion of the flecks 232 with respect to the position of the serialization code 250, and storing the documented color, orientation, and/or the position of the at least a portion of flecks 232 of the identifier 230 on said database. Further details on the commissioning of the apparatus 200 are discussed below.

Figure 3:
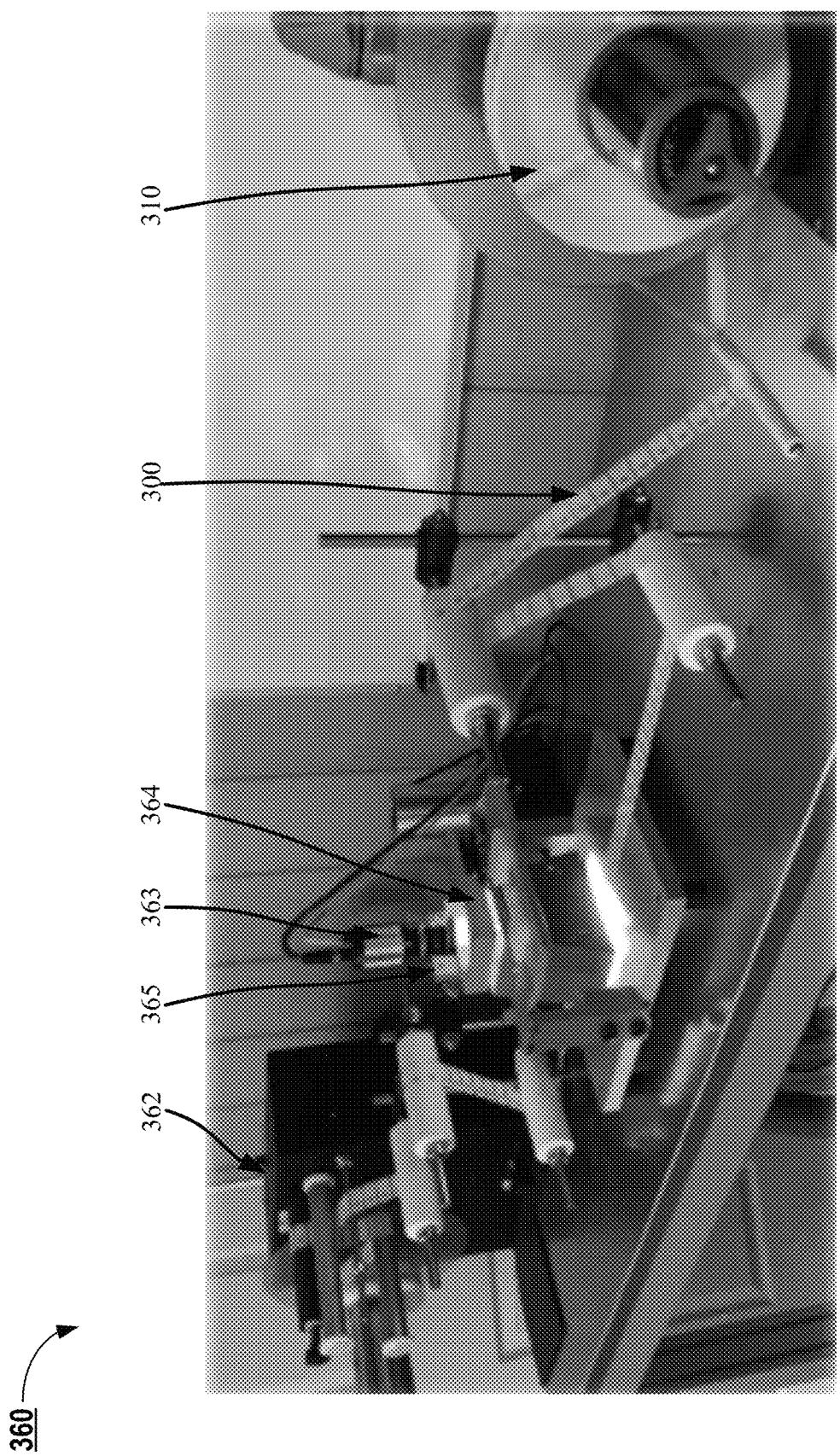
FIG. 3 is an image of an imaging device to capture and store unique signatures associated with a plurality of apparatus for authenticating tangible products.

FIG. 3 shows an imaging system 360 that can be used to commission a plurality of labels 300 by capturing, storing and analyzing images of said plurality of labels 300. The labels 300 can be similar to or substantially the same as one or more portions of the apparatus 100 and the apparatus 200 previously disclosed. For example, the each of the labels 300 can include a substrate 310, an identifier 330, and a serialization code 350. The identifier 330 and the serialization code 350 of the label 300 can be characterized using the imaging system 360. The imaging system 360 can be configured to characterize the plurality of labels 300 by capturing image data of at least a portion of the identifier 330 of the label 300, reading the unique serialization code 350 of the label 300, storing the image data and the serialization code 350, analyzing the stored image data to identify one or more characteristics such as the color, position and orientation of at least a portion of the flecks 332 comprising the identifier 330, and storing the identified one or more characteristics.

The imaging system 360 can include a conveyor system 362, an image capture device 363, a light source 364, code reader 365, and a processor 366 (not shown in FIG. 3). The imaging system can also be electrically coupled to a database 367 (not shown in FIG. 3) configured to store data generated by the imaging system 360, as further described herein. The conveyor system 362 of the imaging system 360 can be any suitable device configured to transport a plurality of labels 300 to an imaging area comprising the image capture device 363, the light source 364, and the code reader 365. In some embodiments, the conveyor system 362 can be configured to support a roll of a substrate 310 comprising a plurality of labels 300 disposed on the substrate 300, as shown in FIG. 3, to facilitate commissioning a plurality of labels 300 in a continuous and/or automated approach.

The image capture device 363 of the imaging system 360 can include an image sensor, camera, or other imaging technology configured to capture an image of or otherwise read the label 300 identifier 330. In some embodiments, the image capture device 363 can be configured to read or capture an image of each label 300 identifier 330 using at least one of no magnification, low-magnification (e.g., up to about 10×) or high-magnification (e.g., in some embodiments, at least about 10×, at least about 30×, or at least about 50× magnification). The image capture device 363 can be configured to capture one or more images of the identifier 330 with pixel sizes sufficient to permit a processor (not shown in FIG. 3) to process the images, as described in more detail herein. For example, in some embodiments, the image capture device 363 can capture one or more images of the identifier 330 with the images having pixel sizes of about 0.001 inches.

The image capture device 363 can be configured to quickly capture one or more images of the identifier 330 corresponding to each label 300. For example, in some embodiments, the image capture device 363 can be configured to capture the identifier 330 image in such a short period of time that line speed (e.g., a speed at which the good is moved through a production line) is not adversely affected. The image capture device 363 can be included in or used with a system in place in a manufacturing facility for quality inspection of the label 300. In this manner, the image capture device 363 can be integrated into a manufacturing process with little to no adverse impact on the manufacturing production rate for the label 300.

In some embodiments, the image capture device 363 includes at least one of complementary metal-oxide-semiconductor ("CMOS") technology or charge-coupled device ("CCD") technology. For example, the image capture device 363 can include an image sensor including at least one of a CMOS or CCD array, along with associated electronics as included in known machine vision systems. The image capture device 363 can be configured to detect unique features in the captured image such that the detected unique features can be associated with the identifier 330 of a label 300, a s further described herein.

The light source 364 of the imaging system 360 can be configured to produce light to illuminate at least a portion of the label 300 in order to capture images of the identifier 330 and/or the serialization code 350, and in this manner, facilitate distinguishing aspects of the identifier 330 as read or captured by the imaging system 360. In some embodiments, the light source 364 can be configured to produce light that is on at least one of the visible, ultraviolet or infrared wavelengths. In this manner, for example, the light source 364 can be configured to facilitate viewing of an identifier 330 comprising a plurality of flecks 332 that may be fluorescent. In some embodiments, the light source 364 can be configured to produce light in a variety of configurations based on a number of lighting characteristics, including, for example, an amount of illumination (e.g., a specified number of lights), an angle at which light is directed at the unique signature (the "angle of incidence"), a color wavelength of the light, polarization of the light waves or beams, a degree of coherency of the light waves, a degree of diffusion or focus of the light, or any combination of the foregoing. In some embodiments, the light source 364 of the imaging system 360 can be configured to illuminate the label 300 using a set of predefined lighting characteristics selected to ensure that each label 300 is imaged using optimal, stable, and reproducible conditions.

In some embodiments, the light source 364 of the imaging system 360 can include any suitable type of light including, for example, a light emitting diode ("LED"), an incandescent light, a fluorescent light, an ultraviolet light, or another suitable type of light. For example, in some embodiments, the light source 364 can include an LED array. More specifically, in some embodiments, the light source can include a plurality of banks of LED arrays. Each bank of LEDs can selectively be turned on to emit light or turned off for a particular lighting configuration. As such, the banks of LEDs can generate multiple lighting configurations based on whether each bank of LEDs is turned on or off. The light source 364 can have an exponential number of lighting configurations based on the number of light arrays, as well as the other lighting characteristics noted above, or combination of thereof.

Optionally, in some embodiments, the imaging system 360 can include a chamber or other designated area in which the label 300 can be positioned for being illuminated by the light source 364. In that way, each label 300 can be imaged by the imaging system 360 under controlled and reproducible lighting conditions.

The code reader 365 can be configured to read/and or scan the serialization code 350 of each label 300. For example, in some embodiments, the serialization code 350 can be printed on label 300, and the code reader 365 can be configured to read the printed serialization code 350. In reading the serialization code 350, in some embodiments the code reader 365 can be configured to read instructions included in the code for any specified light characteristics that should be applied or produced by the light source 364 to accurately capture one or more images of the label 300. The instructions may specify a lighting configuration, including, for example, an amount of illumination (e.g., a specified number of lights), an angle of incidence, a color wavelength of the light, polarization of the light waves or beams, a degree of coherency of the light waves, a degree of diffusion or focus of the light, or any combination of the foregoing.

In some embodiments, the imaging system 360 can be configured to compress, or otherwise alter, a file including the captured image data and/or data related to the identifier 330 for each label 300; for example, to facilitate transmission of the captured image and/or data from the imaging system 360 to a database 367, as further disclosed herein.

The processor 366 of the imaging system 360 can configured to detect unique aspects of the images associated with the identifier 350 of a label 300. The processor 366 can be configured to process (e.g., by executing an algorithm) the captured image of a label 300 in a manner sufficient to detect one or more distinguishing features of the label 300 including at least a portion of the identifier 330, and the serialization code 350. The processor 366 can be configured to detect unique aspects related to the shape, spacing, size, pattern, shading, or the like, exhibited by the identifier 330 of a label 300. For example, when the identifier 330 of a label 300 includes flecks 332, the processor 366 of the imaging system 360 can be configured to detect the distribution of the flecks 332 (e.g., with respect to a reference point, the serialization code 350 of said label 300, other flecks 332, or another portion of the label 300) in at least one of a two-dimensional or three-dimensional space, the size of the flecks, the elevation, depth, or other three-dimensional characteristic of the flecks (e.g., with respect to a surface of the good). For example, in some embodiments the processor 366 of the imaging device 360 can be configured to detect the position of the serialization code 350 of a label 300, and generate a cartesian coordinate system (X,Y) centered on the position of the serialization code 350 or a portion of thereof. The position and/or location of at least a portion of the flecks 332 detected by the processor 366 of the imaging system 360 can then be documented, recorded, registered, cataloged or described using the cartesian coordinate system (X,Y) centered on the position of the serialization code 350 or a portion of thereof. In some embodiments, the cartesian coordinate system (X,Y) can be generated such that the position of the individual flecks 332 detected by the processor 366 of the imaging system 360 can be described in SI derived units or any other commonly used unit of length (e.g., cm, µm inch, etc). In another example, the processor 366 of the imaging system 360 can be configured to detect the position of a geometrical center of the serialization code 350 of an label 300, and generate a cartesian coordinate system (X,Y) centered on the position of said geometrical center of the serialization code 350. The positions and/or locations of at least a first fleck 1, a second fleck 2, a third fleck 3, a fourth fleck 4, and a fifth fleck 5 detected by the processor 366 of the imaging system 360 can then be documented recorded, registered, cataloged or described as a group of coordinates (X1,Y1), (X2,Y2), (X3,Y3), (X4, Y4), and (X5,Y5) corresponding to the position of the first fleck 1, first fleck 1, a second fleck 2, a third fleck 3, a fourth fleck 4, and a fifth fleck 5 respectively.

In some embodiments, the processor 366 of the imaging system 360 can be configured to detect unique aspects related to color variation of or shading caused by the flecks 332 of the identifier 330 (e.g., which may occur by the scattering or reflection of light during the imaging process), one or more colors of the flecks 332, or another unique aspect of one or more flecks 332. In particular, the colors of the flecks 332 comprised by the identifier 330 of a label 300, as detected by the processor 366 of the imaging system 360, can vary because of the different indices of refraction of the flecks 332 resulting from their different orientations, sizes, shapes and/or thickness, relative position within the substrate 310 of the label 300, or a combination thereof. The color(s) of at least a portion of the flecks 332 of the identifier 330 can be recorded by the processor 366 and can be used to authenticate a product or good associated with a label 300, as further described herein. In some embodiments, a plurality of flecks 332 of the identifier 330 can include individual flecks 332 of different colors. Said another way, a plurality of flecks 332 of the identifier 330 can include a first group of flecks 332 having a first color, a second group of flecks 332 having a second color, the second color being different from the first color, a third group of flecks 332 having a third color, the third color being different from the color of the first and the second group of flecks, and so on up to an $n^{th}$ group of flecks 332 having an $n^{th}$ color, the $n^{th}$ color being different from all the colors of the first, second, third and $(n-1)^{th}$ groups of flecks 332. In another example, a label 300 can include a plurality of flecks 332 comprising at least one red fleck 332, at least one blue fleck 332, at least one yellow fleck 332, at least one green fleck 332, and/or at least one fleck 332 of one or more different colors. Any suitable number of different colored flecks 332 may be used, including one or more flecks 332 of one, two, three, four, or more different colors The processor 366 can quantify the color of the flecks 332 of the identifier 330 by analyzing an image of the label 300 captured by the imaging system 360, detecting a region of the image where a particular fleck 332 has been identified (as further described herein), using image processing methods reading the relative intensity of each pixel located in the region of the image where that particular fleck 332 was detected in the red/blue/green additive color model RGB, and reporting an RGB value characteristic of the color of said particular fleck 332. For example, for a particular fleck 332 detected by the imaging system 360 the color of the fleck at a given pixel associated to or positioned on the region where the fleck 332 was detected can be expressed by the superimposed intensities of the red, green, and blue lights captured by the detector of the image capture device 363 (e.g., the CMOS or CCD detector) as an RGB triplet (r,g,b) at that pixel. If the superimposed intensities of the red, green, and blue lights captured by the detector correspond to zero intensity, that is the RGB triplet is (0,0,0), the color of the fleck 332 is defined as being black. Similarly, if the superimposed intensities of the red, green, and blue lights captured by the detector correspond to a predefined maximum intensity m, that is the RGB triplet is (m,m,m) the color of the fleck 332 is defined as being white. In some embodiments, prior to imaging a plurality of a plurality of labels 300 (e.g., a roll comprising a large number of labels 300 fabricated according to the methods and techniques previously described) the imaging system 360 can be subjected to a white balancing procedure configured to adjust how the colors are rendered on the images by normalizing the intensity of the detector of the image capture device 363 with respect to a predefined or a measured intensity, for example, by taking the intensity of an image of a known reference color under controlled lighting conditions. In some embodiments, the imaging system 360 can be subjected to a white balancing procedure every time a predefined number of labels 300 have been imaged. In some embodiments, the imaging system 360 can be subjected to a white balancing procedure every time a predefined number of hours of operation of the imaging device 360 is reached. In some embodiments, the imaging system 360 can be subjected to a white balancing procedure every time a predefinednumber of images have been recorded.

The database 367 of the imaging system 360 can be configured to be in electrical communication with the imaging system 360. The database 367 can be in electrical communication with the imaging system 360 in any suitable manner, including, for example, directly via wired or wireless electrical connections, indirectly via an intervening system, network, intranet, internet, cloud, or the like, or any combination of the foregoing. The database 367 can be configured to receive information or data from the imaging system 360. For example, the database 367 can be configured to receive from the imaging system 360 one or more images of a label 300 including images of at least a portion of the identifier 330 and the serialization code 350 of said label 300, data associated with the one or more images of the portion of the identifier 330 and the serialization code 350 of said label 300, and/or data associated with the characterization of the identifier 330 or its image (e.g., the color, the orientation and/or the position of at least a portion the flecks 332 comprised by the identifier 330, or metrics thereof).

The database 367 can be configured to store the information received from the imaging system 360. For example, the database 367 can be configured to store at least one of the captured images of the identifier 330, information or data associated with the captured images, information or data associated with the characterization of the identifier 330 such as for example, the color at least a portion of the flecks 332, and the orientation, and/or the position of at least a portion of the flecks 332 with respect to the position of the serialization code 350, or a combination of the foregoing. In some embodiments, the database 367 can be configured to store the captured images in a manner that the captured images are electronically linked with other information or data associated with the captured images or the characterization of the identifier 350 that is also stored by the database. In this manner, when the captured images are retrieved from the database 367, the linked information or data is retrieved, or is easily retrievable, with the captured image, or vice versa. In some embodiments, the database 367 can be configured for long-term or permanent storage of the information received from the imaging system 360, and can include, for example, a hard drive system.

The database 367 can be configured to be in electrical communication with external devices and/or components in addition to the imaging system 360. For example, in some embodiments, the database 367 can be in electrical communication with a computing device of a user. The computing device of said user can include a handheld device (e.g., a scanner, a Smartphone with camera, a computer tablet, an SMS device) configured to image an label 300 which has been previously associated with product or good, as further disclosed herein. The database 367 can be placed in communication with the computing device of a user such that information associated with the serialization code 350 and the unique identifier 330 of a label 300 has been previously associated with product or good, can be transmitted from the computing device of the user to the database 367 (e.g., independently of the imaging system 360) for storage therein. In some embodiments, the database 367 can be configured to store a record of each query transmitted from a computing device of a user.

Label Activation Procedure

As discussed above, the commissioning of a label 300 can include performing a number of procedures or steps with the purpose of acquiring specific information or data related to the identifier 330 and the serialization code 350 of the label 300. Upon commissioning, a label 300 can be activated by evaluating the validity of the label 300 and then associating the label 300 with a product or good in such a way that the label 300 facilitates tracking the product or good as it moves along the supply chain, and/or to verify the authenticity of product or good by a user or consumer. For example, in some embodiments, a reader device 380 can be configured to read the serialization code 350 of a commissioned label 300, and query information stored in the database 367 for analyzing information associated with the read serialization code 350 against the stored information and evaluate the validity of the label 300. The commissioned label 300 can then be associated to a product or good by for example, applying the label 300 onto the packaging of said product or good at (or aligned with) a predefined location, and linking the information of said product to the label 300 (e.g., by storing an association between the label 300 and the product or good in a memory, for example as an entry in a database), thereby activating the label 300. The applying the label 300 onto the packaging of said product or good can occur, for example, any point in a distribution channel, at a packaging facility, at a wholesaler, at a retailer, at customs (e.g., if the good is being imported and/or exported), upon delivery to a consumer, or at another point in the supply chain.

In some embodiments, the reader device 380 can include a handheld device (e.g., a scanner, a smartphone with camera, a computer tablet, a short message service (SMS) device) or a portable field device. In this manner, at least a portion of the reader device 380 is generally mobile and can be easily transported between and/or around shipping vessels, warehouses, or other locations, for associating products or goods with a plurality of labels 300 at various locations in the supply chain or government customs site. In some embodiments, the reader device 380 can include a stationary component, such as a flat-bed scanner. The reader device 380 can be similar to and/or substantially the same as one or more portions (and/or combination of portions) of the imaging system 360 described above. For example, the reader device 380 can include an image capture device, a light source, code reader, and a processor, similar to the image capture device 363, the light source 364, the code reader 365, and the processor 366. Consequently, the reader device 380 and/or aspects thereof are not described in further detail herein.

In some embodiments, the reader device 380 can be configured to read the serialization code 350 of a commissioned label 300 in order to evaluate the validity of the label 300. In addition to reading the serialization code 350, the reader device 380 can be configured to image at least a portion of the unique identifier 330 of a commissioned label 300, analyze the captured images, process (e.g., by executing an algorithm) the captured images of the label 300 in a manner sufficient to detect one or more distinguishing features of the label 300 (e.g., the color, position, and/or orientation of a portion of the flecks 332 comprising the identifier 330), and query the database 367 for analyzing information associated with the color, position, and/or orientation of the portion of the flecks 332 comprising the identifier 330 against the stored information and evaluate the validity of the label 300, providing two layers of security to the activation process. The commissioned label 300 can then be associated to a product or good by for example, applying the label 300 to the packaging of said product or good at a specified point, and linking the information of said product or good to the specific label 300, therefore activating the label 300. In some embodiments, linking the information of a product or good with a label 300 can include storing information specific to the product or good on the database 367 along with the data associated with the captured images, information or data associated with the characterization of the identifier 330 such as for example, the color at least a portion of the flecks 332, and the orientation, and/or the position of at least a portion of the flecks 332 with respect to the position of the serialization code 350, or a combination of the foregoing. In some embodiments, the information of the product or good used to link the product or good with a label 300 can include information related to one or more characteristics of the product, including, but not limited to the product serial number, color, technical specifications, production batch number, country of origin, expiration date, and/or targeted market. In some embodiments, the information of the product or good being associated with a label 300 can be entered to the database 367 manually (e.g., by a consumer or user) with the aid of the reader device 380. In some embodiments, the information of the product or good being associated with a label 300 can be entered automatically by the reader device 380 by capturing images or reading other serialization codes describing the one or more characteristics of the product as displayed on the product itself, or on its packaging.

Label Authentication Procedure

Figure 5:
FIG. 5 is an image of a user interface for authenticating tangible products according to an embodiment.

A product or good that has been associated with an activated, commissioned label 300 can subsequently be authenticated by a user and/or a consumer. As such, the product or good can be authenticated and/or traced throughout its movement through the supply chain until reaching a final consumer. For example, the product or good can be scanned at one or more of a shipping facility, a customs facility, a warehouse, a wholesaler, a retailer, a pharmacy, or at a location of a final consumer of said product or good. In some embodiments, a product or good can be interrogated once, twice, three, four or more times as the product or good is being moved through the supply chain. A user or a consumer can authenticate a product or good that has been associated with a label 300 by using a consumer handheld device (e.g., a Smartphone with camera, a computer tablet, an SMS device, a smart watch or the like), as shown in FIG. 5. In some embodiments, the consumer handheld device can be similar to and/or substantially the same as one or more portions (and/or combination of portions) of the reader device 380 described above. For example, the consumer handheld device can include an image capture device, a light source, a code reader, and a processor, similar to those described in reference to the reader device 380. Consequently, the consumer handheld device and/or aspects thereof are not described in further detail herein.

A consumer can use his or her consumer handheld device to authenticate a product or good associated with a label 300 by capturing images of the label 300 using the image capture device (e.g., the built-in camera of the handheld device), modifying the images to produce modified images, characterizing the identifier 330 and the serialization code 350 by processing the modified images, identifying within the modified images a portion of flecks 332 of the identifier 330, identifying metrics associated with said portion of flecks 332, comparing the identified metrics with metrics associated with the flecks 332 of the label 300, and displaying, based on the comparison, a message indicating the authenticity of the label 300 and the product or good associated with the label 300. Further details of the authentication of a label 300 are disclosed herein.

Figure 4:
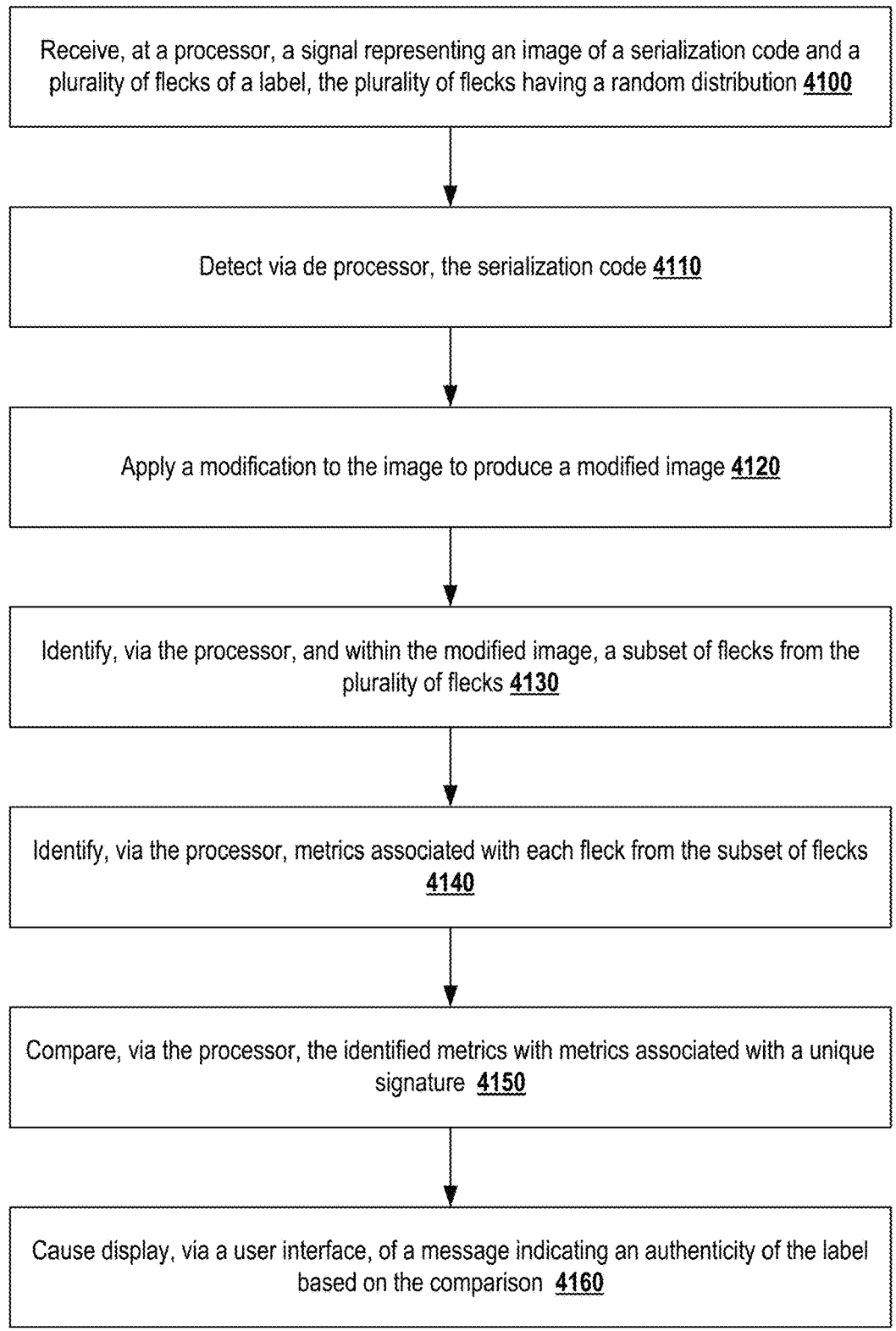
FIG. 4 is a flowchart of an authentication method according to an embodiment.

FIG. 4 shows a flow chart of a method 4000 for tracking and authenticating a product or good associated to an apparatus 400 according to an embodiment. The apparatus 400 can be similar to or substantially the same as one or more portions of the apparatus 100, 200 and 300 described above. For example, the apparatus 400, which can also be referred to as the label 400, can include a substrate 410, an identifier 430, and a serialization code 450. The authentication method 400 can be performed by a consumer and/or user, for example, using a label 400 associated with a product or good, and a consumer handheld device. The authentication of a label 400 and a product or good associated with the label 400 can be initiated by using the consumer handheld device to capture a plurality of images of the label 400 and transmitting and/or transferring said images to the processor of the consumer handheld device At 4100, the processor of the consumer handheld device receives a signal representing an image (e.g., captured by the camera of the consumer handheld device) of a serialization code and a plurality of flecks of a label 400, the plurality of flecks having a random distribution. The first image can be analyzed by the processor of the handheld device to detect the serialization code 450 and at least a portion of the identifier 450 of the label 400. In particular, the first image can include at least a portion of the flecks 432 of the identifier 430.

At 4110, the processor of the consumer handheld device processes (e.g., by executing an algorithm) the image of the label 400 to detect one or more distinguishing features of the label 400, including the serialization code 450. The processor of the consumer handheld device can be configured to detect unique aspects related to the shape, spacing, size, pattern, shading, or the like, exhibited by serialization code 450 of the label 400. The processor of the consumer handheld device can be configured to determine whether the serialization code 450 is present in the image. If the serialization code 450 is not present in the first image, the processor can cause the interface of the consumer handheld device to display a message indicating that another image needs to be captured. This process can be repeated until the processor can successfully determine that the serialization code 450 is present in an image captured by the consumer handheld device. Alternatively, in some embodiments, the processor can be configured to cause the interface of the consumer handheld device to display a message indicating that the label 400 could not be authenticated.

At 4120, a modification is applied to the image (e.g., by the processor of the consumer handheld device and/or by one or more remote processors in network communication with the consumer handheld device). In some implementations, the modification is applied to the image in response to the serialization code 450 being detected at 4110 but not sufficiently readable (e.g., the bars, features and/or alphanumeric code associated with the serialization code are not clearly or fully resolvable, detectable, or displayed in the image). The processor(s) can be configured to perform a number of image modification procedures including deskew (e.g., straighten bent, contorted, angled, deformed or bowed images), despeckle and noise removal, black border removal, deformation correction, inverse text correction, line removal, streak removal, smoothing, light an color balancing, resizing and scaling, rotating, convoluting and the like, to produce a modified image in which the serialization code 450 can be accurately read. The processor of the handheld device can be configured to perform one or more image modification procedures and then evaluate the modified image to evaluate if the serialization code 450 can be accurately read. In the event that the serialization code 450 can be read, the processor can be configured to read the serialization code 450. In some embodiments, the processor of the consumer handheld device can be configured to further modify the image by applying a white balancing procedure as described above with reference to the processor 366 of the imaging system 360. In the event that the serialization code 450 cannot be read from the modified image, the processor can cause the interface of the consumer handheld device to display a message indicating that the label 400 and the product or good associated with the label 400 have not been authenticated. Alternatively, processor can cause the interface of the consumer handheld device to display a message indicating that a new image needs to be captured.

At 4130, a subset of flecks 432 of the identifier 430 is identified (e.g., by the processor of the consumer handheld device and/or by the one or more remote processors) from within the modified image. In some embodiments, identifying a subset of flecks 432 of the identifier 430 includes processing the captured image. Processing the captured image can include running an algorithm configured to detect unique characteristics of the flecks in the captured image. For example, the processing can include detecting the size, the shape, the color and/or the elevation of the flecks respect to a surface of the label 400. In some embodiments, the processor can be configured to identify within the modified image a subset of flecks 432 of the identifier 430 by using, for example, a computer vision engine and/or a machine learning engine. In some embodiments, the computer vision engine can separate foreground objects (e.g., objects that resemble a fleck 332) from background objects (e.g., the color substrate 410 of the label 400 away from flecks 332, the serialization code 450 or any other feature included in the label 400). After processing the figure, the computer vision engine can generate information streams of observed features on the figure (e.g., the color, shape, size and relative position of a fleck 332).

In some embodiments, the processor of the handheld device can identify within the modified image a subset of flecks 432 based on a predefined fleck 432 size. For example, in some embodiments, the fleck 432 size can be about 150 µm, about 200 µm, about 350 µm, about 400 µm, about 500 µm, about 600 µm, or about 650 µm, inclusive of all values and ranges therebetween. In other embodiments, the size of the flecks 432 can be between 200 and 250 µm, between 200 and 300 µm, between 300 and 400 µm, between 300 and 500 µm, between 400 and 600 µm, or between 200 and 650 µm inclusive of all values and ranges therebetween. In the event that the number of flecks 432 identified within the modified image based on a predefined fleck 432 size is smaller than 15, the processor can cause the interface of the consumer handheld device to display a message indicating that the label 400 and the product or good associated with the label 400 have not been authenticated In some embodiments, the processor of the handheld device can identify within the modified image a subset of flecks 432 based on a predefined fleck 432 shape, characterized by a fleck 432 shape ratio (e.g., the ratio of the dimension of a fleck 432 in a first direction with respect to the dimension of that fleck 432 in a second direction different from the first direction. For example, in some embodiments, the flecks 432 ratio can be no more than 1.00, no more than 0.950, no more than 0.900, no more than 0.850, or no more than 0.800, inclusive of all values and ranges therebetween. In some embodiments the flecks 432 ratio can be at least about 0.800, at least about 0.850, at least about 900, at least about 950 at least about 1.00, at least about 1.050, at least about 1.100 inclusive of all values and ranges therebetween. In the event that the number of flecks 432 identified within the modified image based on a predefined fleck 432 shape is smaller than 15, the processor can cause the interface of the consumer handheld device to display a message indicating that the label 400 and the product or good associated with the label 400 have not been authenticated In some embodiments, the processor of the handheld device can identify within the modified image a subset of flecks 432 based on a predefined number of flecks 432. For example, in some embodiments, the number of flecks 432 can be no more than 50, no more than 45, no more than 40, no more than 35, no more than 30, or no more than 25 inclusive of all values and ranges therebetween. In some embodiments, the number of flecks 432 can be at least about 15, at least about 18, at least about 20, at least about 23, at least about 25, at least about 30, at least about 45, or at least about 50 inclusive of all values and ranges therebetween.

At 4140, metrics associated with each fleck from the subset of flecks 432 identified at 4130 are identified (e.g., by the processor of the handheld device and/or by the one or more remote processors). In some embodiments, the processor can be configured to detect or identify the position of the serialization code 450 and generate a cartesian coordinate system (X,Y) centered on the position of the serialization code 450 or a portion of thereof (e.g., the geometrical center of the serialization code 450, a predefined edge of the serialization code 450, or the like) such that the position and/or location of each fleck 432 of the subset of flecks 432 identified at 4130 can be described using the cartesian coordinate system (X,Y) centered on the position of the serialization code 450.

In some embodiments, the processor can be configured to detect or identify the color of each fleck from the subset of flecks 432 identified at 4130. In some embodiments, the processor can be configured to read the relative intensity of each pixel in the red/blue/green additive color model RGB, and report an RGB value characteristic of the color of said particular fleck 332, as described above with reference to the processor 366 of the imaging system 360.

At 4150, the identified metrics are compared with a unique signature (e.g., via the processor of the handheld device and/or by the one or more remote processors), the unique signature including the metrics or data stored on the database 467 and associated with the characterization of the identifier 430. The data stored on the database 467 and associated with the characterization of the identifier 430 can include the color of at least a portion of the flecks 432, and the orientation, and/or the position of at least a portion of the flecks 432 with respect to the position of the serialization code 450, as described above with respect to the commissioning of the label 300. In some embodiments, the processor is configured to execute an algorithm to analyze the unique signature. For example, the processor can be configured to execute an algorithm (e.g., an automated algorithm) for statistical comparison of the identified metrics against the unique signature stored on the database 467, in which the algorithm can include mutual information, Pearson's chi-square and/or x-squared tests, Spearman's rank correlation coefficient (or Spearman's rho), another statistical correlation, or any combination of the foregoing. Additionally, the processor can be configured to include a neural network, a support vector machine, another statistical learning tool or algorithm, or any combination of the foregoing, to facilitate the comparison.

In some embodiments, when the comparison of the identified metrics of a fleck of the subset of flecks 432, particularly the positions and/or location of the fleck 432, with the positions and/or location of the flecks 430 recorded during the commissioning of the label 400 is deemed to exceed a predefined magnitude, said fleck 432 of the subset of flecks 432 is designated as non-matching. In some embodiments, said predefined magnitude can be no more than 200 µm. In the event that fewer than a predefined number of flecks (e.g., 15 flecks) from the subset of flecks 432 identified at step 4130 are deemed to be a match, the processor of handheld device can cause the interface of the consumer handheld device to display a message indicating that the label 400 and the product or good associated with the label 400 have not been authenticated.

At 4160, the processor of the handheld device can cause the interface of the consumer handheld device to display an indication of an authenticity of the label based on the comparison. In the event that 15 flecks or more from the subset of flecks are deemed to be a match at step 4150, the processor of handheld device can cause the interface of the consumer handheld device to display a message indicating that the label 400 and the product or good associated with the label 400 have been successfully authenticated.

Optionally, in some embodiments, the processor of the handheld device can be further configured to evaluate the relative brightness of each one of the flecks 432 from the subset of flecks 432 deemed to be a match at 4160. The processor can be configured to evaluate the brightness of each fleck 432 of the flecks 432 and compare its brightness with a predefined value of brightness (e.g., a brightness that can be described as a glowing fleck 432). In the event that at least 3 of the flecks 432 from the subset of flecks 432 deemed to be a match at 4160 have a brightness exceeding the predefined level of brightness, the processor can cause the interface of the consumer handheld device to display a message indicating that the label 400 and the product or good associated with the label 400 have been successfully authenticated.

Figure 6:
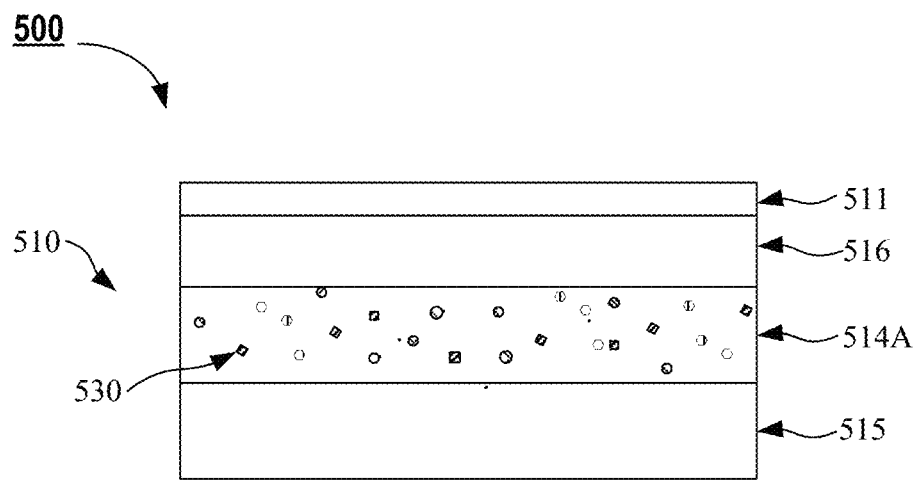
FIG. 6 is a schematic illustration of an apparatus for authenticating a tangible product, according to an embodiment.

FIG. 6 shows a schematic illustration of an apparatus 500 for authenticating a tangible product according to an embodiment. The apparatus 500 can be similar to or substantially the same as one or more portions of the apparatus 100 and/or 200. Thus, portions of the apparatus 500 may not be described in further detail herein. The apparatus 500, which can also be referred to as the label 500, includes a substrate 510, an identifier 530, and a serialization code (not shown). The substrate 510 includes multiple stacked layers including a top coating 511, a face stock layer 516, an adhesive layer 514A (also referred to herein as an "under coating," and which includes the identifier 530, for example flecks), and a white base layer 515. The adhesive layer 114A can be pre-mixed with the identifier 130 and then cast and/or coated onto the white base layer 515. The adhesive layer 514A can be coupled to the face stock layer 516 and the top coating 511 to provide protection of the components of the label 500 against chemicals, UV light degradation, scratches and the like. The identifier 530 of the label 500 can be similar or substantially similar to the identifier 130 described with respect to the apparatus 100. That is, in some implementations, the identifier 530 can include a group of small flecks, particles, specks, spots, dots, whorls, arches, or any three-dimensional object or pattern, which are collectively referred to herein as "flecks." The face stock layer 516 can include, for example, biaxially-oriented polypropylene (BOPP).

Figure 7:
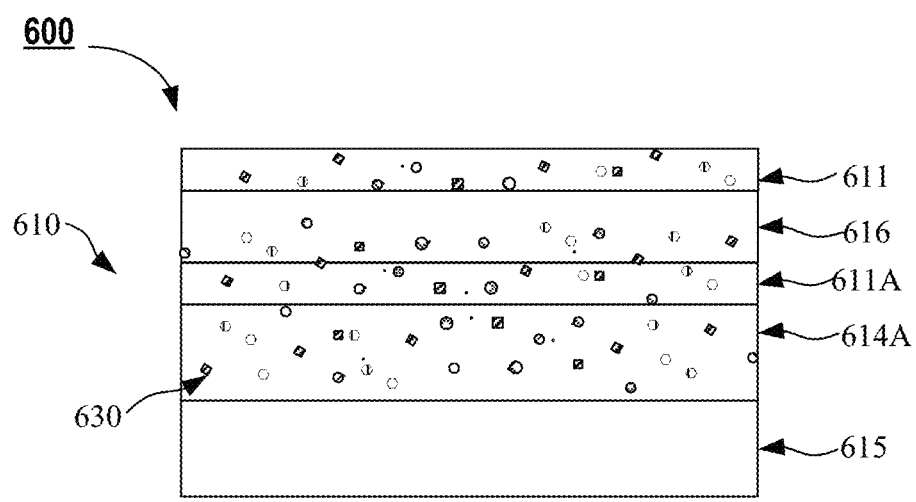
FIG. 7 is a schematic illustration of an apparatus for authenticating a tangible product, according to an embodiment.

FIG. 7 shows a schematic illustration of an apparatus 600 for authenticating a tangible product according to an embodiment. The apparatus 600 can be similar to or substantially the same as one or more portions of the apparatus 100, 200, and/or 500. Thus, portions of the apparatus 600 may not be described in further detail herein. The apparatus 600, which can also be referred to as the label 600, includes a substrate 610, an identifier 630, and a serialization code (not shown). In this embodiment, the substrate 610 includes multiple stacked layers including a top coating 611, a face stock layer 616, a top coating 611A (also referred to as an under coating), an adhesive layer 614A, and a white base layer 615. In this embodiment, the top coating 611, the face stock layer 616, the under coating 611A, and the adhesive layer 614A are configured to collectively accommodate and/or house the identifier 630, as shown in FIG. 7. The identifier 630 of the label 600 can be similar or substantially similar to the identifiers 130, 230, and 530 described with respect to the apparatus 100, 200, and 500, respectively. In some implementations, the identifier 630 can include a group of small flecks, particles, specks, spots, dots, whorls, arches, or any three-dimensional object or pattern, which are collectively referred to herein as "flecks" that can be randomly disposed on the top coating 611, the face stock layer 616, the under coating 611A, and the adhesive layer 614A. In some implementations, the identifier 630 can include a plurality of flecks having multiple colors, shapes, textures, and/or sizes distributed randomly on the top coating 611, the face stock layer 616, the under coating 611A, and the adhesive layer 614A. In other implementations, the identifier 630 can include a first portion of flecks having a first color, shape, texture, and/or size, with the first portion of flecks being disposed on the top coating 611. The identifier 630 can also include a second portion of flecks having a second color, shape, texture, and/or size different from the first color, shape, texture, and/or size, and disposed on the face stock layer 616. Similarly, the identifier 630 can also include a third (and fourth) portion of flecks having a third (and a fourth) color, shape, texture, and/or size different from the first and the second color, shape, texture, and/or size, and disposed on the under coating 611A (and the adhesive layer 614A).

In some embodiments, a method includes receiving, at a processor, a signal representing an image of a serialization code and a plurality of flecks of a label. The plurality of flecks has a random distribution, and can include holographic flecks. The processor detects the serialization code, and a modification is applied to the image to produce a modified image. The modification can include at least one of cropping, deskewing, or adjusting a white balance of the image. The processor identifies a subset of flecks (e.g., including 5 flecks) from the plurality of flecks within the modified image, and identifies metrics associated with each fleck from the subset of flecks. The processor compares the identified metrics with metrics associated with a unique signature, and causes display, via a user interface, of a message indicating an authenticity of the label based on the comparison. The identifying the subset of flecks can includes detecting a plurality of unique features of the modified image, determining a characteristic for each unique feature from the plurality of unique features, comparing each of the characteristics with a plurality of predefined characteristics to determine a plurality of matched features, and identifying the plurality of matched features as the subset of flecks. The characteristic of each unique feature from the plurality of unique features can include one or more of: a size of that unique feature, a color of that unique feature, or a shape of that unique feature. The method optionally also includes creating an annotated image based on the comparison, and causing storage of the annotated image in a database operably coupled to the processor.

In some embodiments, the metrics associated with each fleck from the subset of flecks include a relative location of that fleck with respect to a location of the serialization code. The plurality of flecks can include flecks that are at least one of substantially planar, substantially square-shaped, or substantially rectangular-shaped.

In some embodiments, an apparatus includes a label, the label including a substrate, a serialization code (e.g., including a bar code), and a plurality of flecks. The plurality of flecks has a random distribution, and the random distribution includes a plurality of different positions and a plurality of different orientations relative to the substrate. At least a subset of flecks from the plurality of flecks forms a unique signature that is associated with a tangible product and that is configured to be captured by an imaging device for verification of an authenticity of the tangible product. The label optionally also includes a top layer coupled to the substrate, and the plurality of flecks can be randomly disposed between the substrate and the top layer.

In some embodiments, the plurality of flecks is disposed within at least one of an adhesive layer, a base layer, or a face stock layer of the substrate.

In some embodiments, a first group of flecks from the plurality of flecks has a first color, and a second group of flecks from the plurality of flecks has a second color different from the first color. Alternatively or in addition, the at least one fleck from the plurality of flecks can be configured to exhibit a predefined level of brightness when illuminated.

In some embodiments, a non-transitory, processor-readable medium stores processor-executable instructions to: (i) receive a signal representing an image of a unique signature, the unique signature including a serialization code and a plurality of flecks, the plurality of flecks having a distribution, (ii) detect the serialization code, (iii) apply a modification to the image to produce a modified image, (iv) identify, within the modified image, a subset of flecks (e.g., including 5 flecks) from the plurality of flecks, (v) identify metrics associated with each fleck from the subset of flecks, (vi) compare the identified metrics with metrics associated with the unique signature, and (vii) cause display, via a user interface, of a message indicating an authenticity of the unique signature based on the comparison. The instructions to apply a modification to the image can include instructions to one of crop, deskew, or adjust a white balance of the image. The instructions to identify the subset of flecks from the plurality of flecks can include instructions to detect a plurality of unique features of the modified image, determine a characteristic for each unique feature from the plurality of unique features, compare each of the characteristics with a plurality of predefined characteristics to determine a plurality of matched features, and identify the plurality of matched features as the subset of flecks. The processor-readable medium can also store processor-executable instructions to repeat steps (i) to (vii) a predefined number of times, or until a desired confidence level is reached.

In some embodiments, the characteristic of each unique feature from the plurality of unique features includes one or more of: a size of that unique feature, or a color of that unique feature.

In some embodiments, a first group of flecks from the plurality of flecks has a first color, and a second group of flecks from the plurality of flecks has a second color different from the first color. Alternatively or in addition, at least one fleck from the plurality of flecks can be configured to exhibit a predefined level of brightness when illuminated.

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. For example, although the method 400 is illustrated and described as assigning a serialization code to the good after characterizing the unique signature of the good, in other embodiments, the assigning and characterizing can occur concurrently. In another example, the assigning can occur before the unique signature is characterized. In such an embodiment, the method 400 can optionally include reading and processing the serialization code concurrent with reading and processing the unique signature. Thus, the breadth and scope of the invention should not be limited by any of the above-described embodiments. While the invention has been particularly shown and described with reference to specific embodiments thereof, it will be understood that various changes in form and details may be made.

The invention claimed is:

1. A method, comprising:
receiving, at a processor, a signal representing an image of a serialization code and a plurality of flecks of a label, the plurality of flecks having a random distribution;
detecting, via the processor, the serialization code;
applying a modification to the image to produce a modified image;
identifying, via the processor and within the modified image, a subset of flecks from the plurality of flecks;
identifying, via the processor, metrics associated with each fleck from the subset of flecks;
comparing, via the processor, the identified metrics with metrics associated with a unique signature; and
causing display, via a user interface, of a message indicating an authenticity of the label based on the comparison.

2. The method of claim 1, wherein identifying the subset of flecks includes:
detecting a plurality of unique features of the modified image;
determining, for each unique feature from the plurality of unique features, a characteristic;
comparing each of the characteristics with a plurality of predefined characteristics to determine a plurality of matched features; and
identifying the plurality of matched features as the subset of flecks.

3. The of claim 2, wherein the characteristic of each unique feature from the plurality of unique features is one of: a size of that unique feature, a color of that unique feature, or a shape of that unique feature.

4. The method of claim 1, wherein the modification includes at least one of cropping, deskewing, or adjusting a white balance of the image.

5. The method of claim 1, wherein the subset of flecks includes at least 5 flecks.

6. The method of claim 1, wherein the metrics associated with each fleck from the subset of flecks include a relative location of that fleck with respect to a location of the serialization code.

7. The method of claim 1, further comprising:
creating an annotated image based on the comparison; and
causing storage of the annotated image in a database operably coupled to the processor.

8. The method of claim 1, wherein the plurality of flecks includes holographic flecks.

9. The method of claim 1, wherein the plurality of flecks includes flecks that are at least one of substantially planar, substantially square-shaped, or substantially rectangular-shaped.

10. An apparatus, comprising:
a label, including:
a substrate;
a top layer coupled to the substrate;
a serialization code; and
a plurality of flecks,
the plurality of flecks including a first group of flecks having a first color and a second group of flecks having a second color different from the first color, the plurality of flecks being disposed between the substrate and the top layer and having a random distribution, the random distribution including a plurality of different positions and a plurality of different orientations relative to the substrate,
at least a subset of flecks from the plurality of flecks forming a unique signature that is associated with a tangible product and that is configured to be captured by an imaging device for verification of an authenticity of the tangible product.

11. The apparatus of claim 10, wherein the plurality of flecks is disposed within at least one of an adhesive layer, a base layer, or a face stock layer of the substrate.

12. The apparatus of claim 10, wherein the serialization code includes a bar code.

13. The apparatus of claim 10, wherein the at least one fleck from the plurality of flecks is configured to exhibit a predefined level of brightness when illuminated.

14. A non-transitory, processor-readable medium storing processor-executable instructions to:
  (i) receive a signal representing an image of a unique signature, the unique signature including a serialization code and a plurality of flecks, the plurality of flecks having a distribution;
  (ii) detect the serialization code;
  (iii) apply a modification to the image to produce a modified image;
  (iv) identify, within the modified image, a subset of flecks from the plurality of flecks;
  (v) identify metrics associated with each fleck from the subset of flecks;
  (vi) compare the identified metrics with metrics associated with the unique signature; and
  (vii) cause display, via a user interface, of a message indicating an authenticity of the unique signature based on the comparison.

15. The non-transitory, processor-readable medium of claim 14, wherein the instructions to identify the subset of flecks from the plurality of flecks include instructions to:
  detect a plurality of unique features of the modified image;
  determine, for each unique feature from the plurality of unique features, a characteristic;
  compare each of the characteristics with a plurality of predefined characteristics to determine a plurality of matched features; and
  identify the plurality of matched features as the subset of flecks.

16. The non-transitory, processor-readable medium of claim 15, wherein the characteristic of each unique feature from the plurality of unique features is one of: a size of that unique feature, or a color of that unique feature.

17. The non-transitory, processor-readable medium of claim 15, wherein the instructions to apply a modification to the image include instructions to one of: crop, deskew, or adjust a white balance of the image.

18. The non-transitory, processor-readable medium of claim 14, wherein the subset of flecks includes at least 5 flecks.

19. The non-transitory, processor-readable medium of claim 14, wherein a first group of flecks from the plurality of flecks has a first color, and a second group of flecks from the plurality of flecks has a second color different from the first color.

20. The non-transitory, processor-readable medium of claim 14, wherein at least one fleck from the plurality of flecks is configured to exhibit a predefined level of brightness when illuminated.

21. The non-transitory, processor-readable medium of claim 14, further comprising repeating steps (i) to (vii) a predefined number of times, or until a desired confidence level is reached.

22. A apparatus, comprising:
  a label, including:
    a substrate;
    a top layer coupled to the substrate;
    a serialization code; and
    a plurality of flecks,
    the plurality of flecks being disposed between the substrate and the top layer and having a random distribution, the random distribution including a plurality of different positions and a plurality of different orientations relative to the substrate,
    at least a subset of flecks from the plurality of flecks forming a unique signature that is associated with a tangible product and that is configured to be captured by an imaging device for verification of an authenticity of the tangible product,
    at least one fleck from the plurality of flecks being configured to exhibit a predefined level of brightness when illuminated.

* * * * *